(12) United States Patent
Awad et al.

(10) Patent No.: US 12,250,678 B2
(45) Date of Patent: *Mar. 11, 2025

(54) COMMUNICATION SYSTEM

(71) Applicant: NEC Corporation, Tokyo (JP)

(72) Inventors: Yassin Aden Awad, Tokyo (JP);
Ayesha Ijaz, Tokyo (JP); Robert Arnott, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,692

(22) Filed: Feb. 26, 2024

(65) Prior Publication Data

US 2024/0196397 A1 Jun. 13, 2024

Related U.S. Application Data

(63) Continuation of application No. 16/636,977, filed as application No. PCT/JP2018/029639 on Aug. 7, 2018, now Pat. No. 12,004,149.

(30) Foreign Application Priority Data

Aug. 10, 2017 (GB) .................................. 1712863

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/23* (2023.01); *H04W 76/27* (2018.02)

(58) Field of Classification Search
None
See application file for complete search history.

(56) References Cited

U.S. PATENT DOCUMENTS

2014/0254544 A1 9/2014 Kar Kin Au et al.
2017/0034845 A1 2/2017 Liu et al.
(Continued)

FOREIGN PATENT DOCUMENTS

WO 2017/167198 A1 10/2017
WO 2018/171242 A1 9/2018
WO 2018/184440 A1 10/2018

OTHER PUBLICATIONS

3rd Generation Partnership Project; Technical Specification Group Services and System Aspects; Study on Architecture for Next Generation System (Release 14), 3GPP TR 23.799, V14.0.0, Dec. 2016, 522 pages.

(Continued)

*Primary Examiner* — Srinivasa R Reddivalam
(74) *Attorney, Agent, or Firm* — Sughrue Mion, PLLC

(57) ABSTRACT

A communication system is disclosed in which a communication device transmits, to a base station and using communication resources that may be used for grant-free uplink communications, uplink data and information from which the communication device can be identified, wherein the information from which the communication device can be identified comprises a Cyclic Redundancy Check (CRC) value that is encoded with identity information identifying the communication device (for example, a C-RNTI of the communication device).

7 Claims, 6 Drawing Sheets

(51) Int. Cl.
*H04W 72/23* (2023.01)
*H04W 76/27* (2018.01)

(56) References Cited

U.S. PATENT DOCUMENTS

| | | | |
|---|---|---|---|
| 2017/0272199 A1* | 9/2017 | Dinan | H04L 1/1822 |
| 2018/0035459 A1* | 2/2018 | Islam | H04L 5/0053 |
| 2018/0042043 A1* | 2/2018 | Babaei | H04L 5/0082 |
| 2018/0288746 A1* | 10/2018 | Zhang | H04L 12/189 |
| 2018/0295651 A1* | 10/2018 | Cao | H04W 72/23 |
| 2018/0324772 A1* | 11/2018 | Babaei | H04L 5/00 |
| 2018/0368117 A1 | 12/2018 | Ying | H04L 5/0044 |
| 2018/0375636 A1* | 12/2018 | You | H04W 72/20 |
| 2019/0090269 A1* | 3/2019 | Cao | H04L 1/1893 |
| 2019/0229843 A1 | 7/2019 | Yoshimoto | H04L 1/0041 |
| 2019/0230691 A1 | 7/2019 | Cao et al. | |
| 2019/0387553 A1* | 12/2019 | Gong | H04W 74/0833 |
| 2020/0021402 A1* | 1/2020 | Xu | H04L 1/1887 |
| 2020/0053705 A1* | 2/2020 | Hwang | H04W 52/146 |
| 2020/0068606 A1* | 2/2020 | Zhang | H04W 74/08 |
| 2020/0213901 A1 | 7/2020 | Yoshimoto | H04L 1/1851 |
| 2020/0245376 A1 | 7/2020 | Cao et al. | |

OTHER PUBLICATIONS

3rd Generation Partnership Project; Technical Specification Group Services and System Aspects; Service requirements for Machine-Type Communications (MTC); Stage 1, (Release 14), 3GPP TS 22.368 V14.0.0, Mar. 2017, 26 pages.
"UE identification and HARQ for URLLC UL grant-free", Nokia, Alcatel-Lucent Shanghai Bell, 3GPP TSG-RAN WG1 Ad-Hoc NR#2, Jun. 27-30, 2017, R1-1710994, 5 pages.
"Basic Grant-free Transmission for URLLC", ZTE, ZTE Microelectronics, 3GPP TSG RAN WG1 Meeting #88, Feb. 13-17, 2017, R1-1701594, 8 pages.
"Discussion on grant-free uplink transmission", LG Electronics, 3GPP TSG RAN WG1 Meeting #89, R1-1707655, May 14-19, 2017, 9 pages.
International Search Report for PCT/JP2018/029639 dated Oct. 22, 2018 [PCT/ISA/210].
Written Opinion for PCT/JP2018/029639 dated Oct. 22, 2018 [PCT/ISA/237] English Translation.
LG Electronics, "Discussion on UL transmission without grant", 3GPP TSG RAN WG1 Meeting Ad-Hoc, R1-1710327, Jun. 27-30, 2017, Qingdao, P.R. China, pp. 1-5 (5 pages total).
Communication dated Jan. 23, 2018, from the British Intellectual Property Office No. GB1712863.8.
Extended European Search Report for EP Application No. 22178254. 3, dated on Sep. 5, 2022.
Office Action for EP Application No. 18760064.8, mailed on Oct. 20, 2022.
Japanese Office Action for JP Application No. 2022-038985, mailed on Jan. 17, 2023 with English Translation.
Samsung, "ACK/NAK DTX Detection in PUSCH", 3GPP TSG-RAN WG1 #51bis, R1-080031, Sevilla, Spain, Jan. 14-18, 2008.
Chinese Office Action for CN Application No. 201880052708.8, mailed on Feb. 18, 2023 with English Translation.
JP Office Action for JP Application No. 2023-066795, mailed on Feb. 6, 2024 with English Translation.
MediaTek Inc., "On Use of Scrambling for UL Grant-Free URLLC Transmission", 3GPP TSG RAN WG1 adhoc_NR_AH_1706 R1-1710836, Jun. 2017, pp. 1-pp. 4.

* cited by examiner

COMMUNICATION SYSTEM

CROSS REFERENCE TO RELATED APPLICATIONS

This application is a Continuation of U.S. application Ser. No. 16/636,977 filed on Feb. 6, 2020, which is a National Stage of International Application No. PCT/JP2018/029639 filed on Aug. 7, 2018, claiming priority based on United Kingdom Patent Application No. 1712863.8 filed on Aug. 10, 2017, the disclosure of which is incorporated herein in its entirety by reference.

TECHNICAL FIELD

The present invention relates to mobile communications devices and networks, particularly but not exclusively those operating according to the 3rd Generation Partnership Project (3GPP) standards or equivalents or derivatives thereof. The invention has particular although not exclusive relevance to identification of communication devices performing grant-free transmissions.

BACKGROUND ART

Cellular communication networks generally comprise one or more radio access networks (RANs) that provide items of user equipment (UEs), in at least one discrete geographic region (a cell) covered by the RAN, with access to the communication network to allow the UEs to communicate with one another and to receive (or provide) one or more communication services to one another. The RAN typically comprises a base station which is configured to communicate with the UEs in an associated cell over an air-interface and with communication entities (or 'functions') in a core network (usually over a wired interface) in order to facilitate the set up and maintenance of communication sessions for individual UEs (e.g. for voice/video calls, data services etc.).

Recent developments of the 3GPP standards are referred to as the Long Term Evolution (LTE) of Evolved Packet Core (EPC) network and Evolved UMTS Terrestrial Radio Access Network (E-UTRAN), including LTE-Advanced. These developments are commonly known as '4G'. More recently, the terms '5G' and 'new radio' (NR) refer to an evolving communication technology that is expected to support a variety of applications and services such as enhanced Mobile Broadband (eMBB) communications and Machine Type Communications (MTC). MTC includes for example Internet of Things (IOT) communications, massive Machine Type Communications (mMTC), Ultra-Reliable and Low Latency Communications (URLLC), vehicular communications and autonomous cars (V2V/V2X), high resolution video streaming, smart city services, and/or the like. Specifically, URLLC covers a range of critical applications such as industrial internet, smart grids, infrastructure protection, remote surgery, and intelligent transportation systems, while mMTC focuses on supporting the envisioned 5G IoT scenario with tens of billions of connected devices and sensors.

MTC devices connect to the network to send data to or to receive data from a remote 'machine' (e.g. a server) or user. MTC devices use communication protocols and standards that are optimised for mobile telephones or similar user equipment. However, MTC devices, once deployed, typically operate without requiring human supervision or interaction, and follow software instructions stored in an internal memory. MTC devices might also remain stationary and/or inactive for a long period of time.

In order to mitigate the risk of MTC devices not receiving some transmissions (for example, due to lack of network coverage (e.g. when deployed indoors), in combination with the often limited functionality of MTC devices), it has also been proposed to increase the coverage of certain transmissions (channels) for such devices. One approach for the enhancement of coverage for MTC devices is the repetition of the same information across multiple (e.g. two, three, four, or more) sub-frames. In other words, for MTC devices, the base station duplicates the transmitted information in the time domain (the base station re-transmits the same information in one or more sub-frames subsequent to the sub-frame in which that information is first sent). Similarly, an MTC device duplicates (repeats) the transmitted information in the time domain when sending data to the base station in the uplink. A coverage enhanced MTC device (or the base station, in case of uplink transmissions) can be configured to combine the multiple copies of the (same) information received in the multiple sub-frames, and after combining the received information, it is more likely to be able to decode transmitted data successfully than based on a single copy of the information. 3GPP specified two coverage enhancement (CE) modes for MTC devices: CE Mode A, which employs a relatively small number of repetitions (or no repetition at all); and CE Mode B, which employs a large number of repetitions (and may also employ a higher transmission power). It will be appreciated that 5G systems may provide further coverage enhancement modes for MTC devices.

3GPP technical report (TR) 23.799 V14.0.0 describes a possible architecture and general procedures for NextGen (5G) systems planned for Release 14 of the 3GPP standards. 3GPP also studied the potential use of frequency bands up to 100 GHz for new (5G) radio access networks (employing New Radio (NR) radio technology), with a maximum channel bandwidth of 400 MHz per NR carrier in Rel-15.

Directional beamforming and massive antenna technologies may also be used in order to overcome the severe channel attenuation characteristics associated with certain high frequency bands (e.g. mmWave bands). The term 'massive antenna' refers to an antenna having a high number of antenna elements (e.g. 100 or more) arranged in an array. Effectively, such a massive antenna may be used to communicate with several users at the same time, thus facilitating multi-user multiple-input and multiple-output (MU-MIMO) transmissions.

Whilst a base station of a 5G/NR communication system is commonly referred to as a New Radio Base Station ('NR-BS') or as a 'gNB' it will be appreciated that they may be referred to using the term, eNB (or 5G eNB/NR eNB) which is more typically associated with LTE base stations. In case of MU-MIMO, a base station may also be referred to as a transmission and reception point (TRP). The term 'base station' will be used herein to refer generally to an NR-BS, gNB, eNB, TRP, or any equivalent communication device of a RAN.

One of the tasks of the base station is the provision of scheduling information (or scheduling 'grant') to specific UEs (or groups of UEs) to allow them to communicate in the cellular communication system (i.e. transmit/receive data and control signalling). However, some UEs (typically MTC devices) may be configured to transmit (uplink) data without an associated scheduling grant. This may be beneficial in case of sporadic communications by a group of devices (e.g. MTC devices that do not have frequent transmissions) using specific communication resources where such sporadic communications are less likely to interfere with regular communications (e.g. by conventional UEs or other devices having scheduled transmissions).

There are ongoing discussions in the 3GPP RAN1 work group about the ways in which grant-based (GB) and grant-free (GF) transmissions may be performed. Considering the potentially sporadic nature of MTC/IoT transmissions, it may be beneficial in terms of resource efficiency to share grant-free resources among multiple UEs (MTC/IoT devices).

The following is a summary of some of the agreements reached by 3GPP RAN1:

When a UE is configured with a number (e.g. K) of repetitions for transmission of a transport block (TB)—with or without grant—the UE can continue the repetitions for the TB until one of the following conditions is met:
  if an uplink (UL) grant is successfully received for a slot/mini-slot for the same TB (in which case the UE (re)transmits that TB using the resources identified by the UL grant, including repetitions); and
  the number of repetitions for that TB reaches K (in which case the UE stops transmitting that TB).
It will be appreciated that any other suitable condition for terminating the repetition may also be applied.

Time and frequency resources (for GF) are configured in a UE-specific manner (although more than one UE may be configured with the same resources). It is noted that the time and frequency resources configured for a UE may or may not collide with those for another UE.

Both DFT-S-OFDM (Discrete Fourier Transform spread Orthogonal Frequency Division Multiplexing) and CP-OFDM (Cyclic Prefix Orthogonal Frequency Division Multiplexing) are supported for UL transmissions without grant.

NR supports more than one Hybrid Automatic Repeat Request (HARQ) process for UL transmission without grant.

RAN1 work group considers that a UE transmitting UL transmission without UL grant can be identified based on the time/frequency resources being used for the transmission and RS parameter(s) (specified in the RFC 3556 standard by the Internet Engineering Task Force, IETF).

SUMMARY OF INVENTION

However, the inventors have realised that an appropriate mechanism is needed to identify a particular transmitting UE when multiple UEs share the same time/frequency resources for grant-free transmissions as well as to link the initial grant-free transmissions to specific HARQ processes.

Accordingly, the present invention seeks to provide systems, devices and methods for at least partially addressing one or more of these issues.

In one example aspect, the invention provides a method performed by a communication device of a communication system, the method comprising: transmitting, to a base station and using grant-free communication resources, uplink data and information from which the communication device can be identified; wherein the information from which the communication device can be identified comprises a Cyclic Redundancy Check (CRC) value that is encoded with identity information identifying the communication device.

In another example aspect, the invention provides a method performed by a base station of a communication system, the method comprising: receiving, from a communication device and using grant-free communication resources, uplink data and information from which the communication device can be identified, wherein the information from which the communication device can be identified comprises a Cyclic Redundancy Check (CRC) value that is encoded with identity information identifying the communication device; attempting to decode the CRC value using identity information identifying a candidate communication device; when said attempt is successful, identifying the candidate communication device as the communication device from which the uplink data has been received; and when said attempt is not successful, not identifying the candidate communication device as the communication device from which the uplink data has been received.

In another example aspect, the invention provides a method performed by a base station of a communication system, the method comprising: receiving, from a communication device and using grant-free communication resources, a transmission of uplink data; generating control information for allocating communication resources to the communication device, for at least one of transmitting further uplink data and for retransmitting the received uplink data; wherein the control information is encoded: i) using a temporary network identifier of a first type (e.g. a Cell Radio Network Temporary Identifier (C-RNTI)) for the communication device when the allocation is for transmitting further uplink data or ii) using a temporary network identifier of second type (different to the first type) when the allocation is for retransmitting the received uplink data; and transmitting the encoded control information to said communication device.

In yet another example aspect, the invention provides a method performed by a communication device of a communication system, the method comprising: transmitting, to a base station of the communication system and using grant-free communication resources, a transmission of uplink data; receiving, from the base station, control information for allocating communication resources to the communication device, for at least one of transmitting further uplink data and for retransmitting the transmitted uplink data; wherein the control information is encoded: i) using a temporary network identifier of a first type (e.g. a Cell Radio Network Temporary Identifier (C-RNTI)) for the communication device when the allocation is for transmitting further uplink data or ii) using a temporary network identifier of second type (different to the first type) when the allocation is for retransmitting the transmitted uplink data; and transmitting further uplink data or retransmitting the transmitted uplink data to the base station, using said allocated communication resources, based on said control information.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described by way of example only with reference to the attached figures in which.

DESCRIPTION OF EMBODIMENTS

Overview

Figure 1:
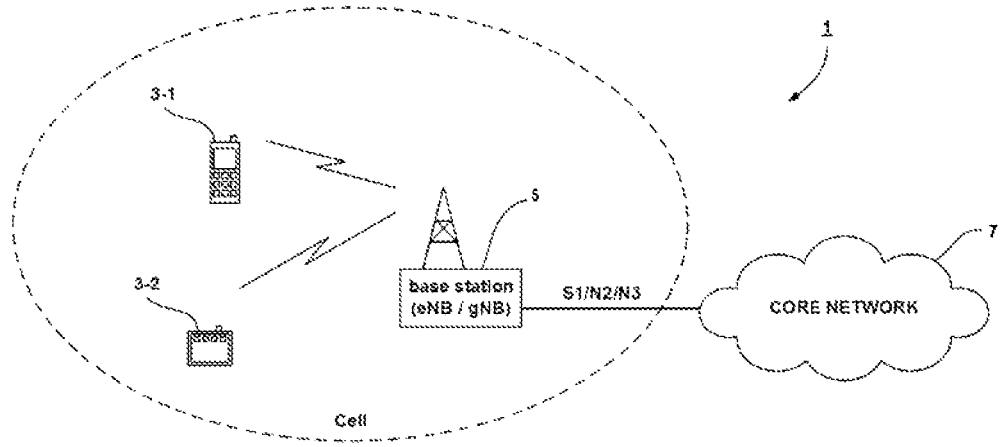
FIG. 1 schematically illustrates a telecommunication system to which example embodiments of the invention may be applied.

FIG. 1 schematically illustrates a mobile (cellular) telecommunication system 1 in which communication devices 3 (such as mobile telephone 3-1 and MTC device 3-2) can communicate with each other and/or with other communication nodes via a base station 5 (e.g. 'eNB' in LTE or 'gNB' in NR) and a core network 7. In order to facilitate such communications, the base station 5 broadcasts appropriate system information in its cell to assist the communication devices 3 to access the cell. The base station 5 also operates a number of uplink and downlink channels for communicating control signalling and user data between the communication devices 3 and the base station 5 (and the core network 7).

As those skilled in the art will appreciate, whilst one mobile telephone 3-1, one MTC device 3-2, and one base station 5 are shown in FIG. 1 for illustration purposes, the system, when implemented, will typically include other base stations and communication devices.

As shown, the base station 5 is connected to the core network 7 via an appropriate core network interface, such as the S1 interface (in LTE) and/or the N2/N3 interfaces (in 5G). The base station 5 is also connected to neighbouring base stations (either directly or through a (home) base station gateway) via an appropriate base station interface, such as the X2 interface (in LTE) and/or the Xn interface (in 5G).

Although omitted from FIG. 1 for sake of simplicity, the core network 7 includes, amongst others, one or more appropriate user-plane functions and one or more control-plane functions for keeping track of the locations of the communication devices 3 within the communication network 1, for storing subscription related information for each UE (e.g. information identifying which communication device 3 is configured as a machine-type communication device), for storing applicable control parameters for each communication device 3, and for handling respective traffic flows for each communication device 3 in accordance with applicable (network/subscription/charging) policies. The core network 7 will typically also include a gateway for connecting to other networks, such as the Internet and/or to servers hosted outside the core network 7.

In this system, uplink and downlink data transmissions and the specific time/frequency resources used for such transmissions are controlled by the base station 5. Specifically, when the base station 5 has downlink data to send, it notifies the intended recipient (e.g. by sending appropriate downlink control information (DCI) via a control channel), prior to sending the downlink data, about the resources that will be used for transmission of the downlink data so that the intended recipient knows which time/frequency resources are to be monitored and decoded. Similarly, when a communication device 3 has uplink data to send, it requests the base station 5 to allocate (via an appropriate DCI) uplink resources for the communication device 3 to send data. This approach is referred to as a grant-based (GB) transmission.

However, some UEs (e.g. the MTC device 3-2) may be configured to transmit data without an uplink grant, including any repetitions if appropriate for that UE (depending on the CE mode of the UE and/or the like). This approach is referred to as a grant-free (GF) transmission. It will be appreciated that the specific set of time/frequency resources available for grant-free transmissions may be allocated (by the base station 5) separately from any time/frequency resources normally used for grant-based transmissions (although they may also overlap with each other in at least one of the time domain and the frequency domain).

Beneficially, the system provides an appropriate mechanism for identifying a particular transmitting communication device 3 when multiple (e.g. a group of) communication devices 3 share the same time/frequency resources for grant-free transmissions. It will be appreciated that the communication devices 3 sharing the same time/frequency resources may be preconfigured (e.g. by the base station 5) or they may have an appropriate mechanism to derive the time/frequency resources to be used (e.g. based on known, UE specific parameters such as UE capability, UE ID, UE category, cell ID, system information, and/or the like).

Specifically, the base station 5 is able to identify a particular communication device 3 transmitting uplink data (using GF resources) based on information forming part of the uplink data. Such information may comprise either explicit or implicit information, and it will be referred to as 'UE ID' in the following. Once the transmitting communication device 3 has been identified by the base station 5, the base station is able to decode the transmitted uplink data, perform soft combining of any grant-free repetitions, trigger grant-based re-transmission (when appropriate, e.g. when the uplink data is not received successfully), and link any re-transmission grant to that particular communication device 3.

In more detail, when the communication device 3 is configured to indicate its associated UE ID explicitly, the communication device 3 masks the cyclic redundancy check (CRC) value of the data being transmitted with its UE ID. In this case, a Cell Radio Network Temporary Identifier (C-RNTI) associated with the communication device 3 or a pre-configured index of the communication device 3 may be used as an appropriate UE ID. Such pre-configured index may comprise for example a reference symbol sequence index.

When receiving uplink data via the resources allocated for GF transmissions, the base station 5 is configured to perform an iterative CRC check procedure using (one by one) the UE IDs of all such UEs that are configured to share the GF resources being used, until the base station 5 finds a UE ID value that results in a passed CRC check for the received data. When the correct UE ID is found (from which the transmitting communication device 3 can be identified) and if the GF uplink transmission has been received successfully by the base station 5, the base station 5 sends an ACK to the identified communication device 3. It will be appreciated that when the uplink data is sent using repetitions, the base station 5 may either send an ACK as soon as it is able decode the received data (e.g. before the UE performs all required repetitions) or it may send an ACK after the last repetition (or send a NACK if the data is not received successfully).

Transmissions via the so-called Physical Uplink Shared Channel (PUSCH) are normally scrambled using a UE-specific scrambling code. Scrambling must be removed before decoding can be performed, so if the base station 5 does not know the UE ID associated with the sender of the data (e.g. as in case of GF transmissions), it would need to perform decoding multiple times which may not be practical. Therefore, in this system, UEs may be configured to use a special scrambling code (e.g. a pre-configured group-specific or a resource-specific scrambling code), at least for GF transmissions. Another option for explicit UE identification is to transmit the UE ID in a separate self-decodable channel along with the grant-free data transmission so that the base station 5 is able to identify the communication device 3 without having to decode the entire uplink data transmission (e.g. an entire transport block).

Beneficially, soft combining of grant-free data repetitions at the base station 5 may lead to an increased probability of successful data decoding, and in turn, it may allow the base station 5 to send an ACK to the UE earlier (in which case the UE can stop any remaining repetitions) thereby increasing resource efficiency and system capacity.

Beneficially, in this system it is possible to link an initial grant-free transmission to a specific HARQ process. Effectively, a HARQ process is a process in which the receiving node provides appropriate feedback, for each transmission (e.g. each transport block), to the corresponding transmitting node to indicate whether or not that transmission was received successfully. Specifically, the receiving node generates and sends an acknowledgement (ACK) if the transmission was received successfully and a negative acknowledgement (NACK) if the transmission was not received successfully. Therefore, in the system shown in FIG. 1, the base station 5 is configured to transmit respective ACKs to the communication device 3 for those uplink transmissions (transport blocks) that succeeded, and transmit a NACK for those uplink transmissions that failed to receive correctly. It will be appreciated that the ACK/NACK is sent using a specific resource following the transmission to which it relates (and the ACK/NACK resource depends on the resources used for the transmission to which it relates) so that the transmitting device is able to determine, without requiring additional signalling, which transmissions succeeded and which ones failed. When a particular uplink transmission (e.g. GF or GB transmission) fails, the base station 5 returns a NACK to the sending communication device 3. Then, depending on its configuration, the communication device 3 may re-transmit the data that failed (using either GF or GB resources) or mark it as undelivered data (with or without attempting retransmission thereof).

In this system, it is possible to use, for the same communication device 3, both grant-free and grant-based HARQ processes in parallel. This is achieved by providing an appropriate link between GF and GB transmissions to HARQ processes.

When a communication device 3 supports grant-free and grant-based HARQ processes in parallel, the base station 5 indicates whether a particular UL grant is for a particular HARQ process with GB (re)transmission or for a GF initial transmission. It will be appreciated that in the GB case, the base station 5 already knows which UE is going to (re)transmit the data, since the data is transmitted using the resources allocated for a specific UE. However, in the GF case, the base station 5 may not have yet identified the UE that transmitted GF data due to resource sharing among multiple UEs (i.e. time-frequency resources and/or RS sequence index may be shared).

Thus, in order to differentiate between HARQ processes for GB and GF transmissions, the base station 5 is configured to perform masking of the associated DCI using different identifiers (of the same UE). Specifically, in one example, the base station may be configured to mask the DCI for GB transmissions using the C-RNTI (for a given UE), and to mask the DCI for GF retransmission (for that UE) using a so-called 'grant-free' Radio Network Temporary Identifier (GF-RNTI). It will be appreciated that the GF-RNTI may be made specific to the frequency resources and RS sequence index that a UE has applied to transmit the initial GF data (using e.g. an appropriate formula known to both the communication device 3 and the base station 5).

The GF-RNTI for a given communication device 3 may be calculated using one of the following options:
1) Both the base station 5 and the communication device 3 calculate the GF-RNTI using a specific formula. In this case the base station 5 is configured to signal all the necessary parameters to the communication device 3.
2) The base station 5 calculates the GF-RNTI using an appropriate formula (e.g. using UE/resource specific parameters) and signals the GF-RNTI explicitly to the communication device(s) 3 to which it is applicable. In this case the communication device 3 does not need to know the formula (and/or parameters) being used for the calculation of the GF-RNTI.

It will also be appreciated that GB transmissions may utilise any available HARQ processes (for that UE) when there are no active UL GF transmissions (assuming that this is allowed/configured by the base station 5). In this case, however, if the UE needs to use a particular HARQ process number for a new GF transmission (and if the HARQ process number for a given GF transmission is determined by the timing of that GF transmission), and if that particular HARQ process is already in use for a GB transmission, then the UE may be configured to prioritise the HARQ process for GF transmission (and abandon the ongoing GB HARQ process).

In summary, using the above described approach, it is possible to identify a particular transmitting UE when multiple UEs share the same time/frequency resources for grant-free transmissions. It is also possible to link an initial grant-free transmission to a specific HARQ process for improved efficiency.

Communication Device

Figure 2:
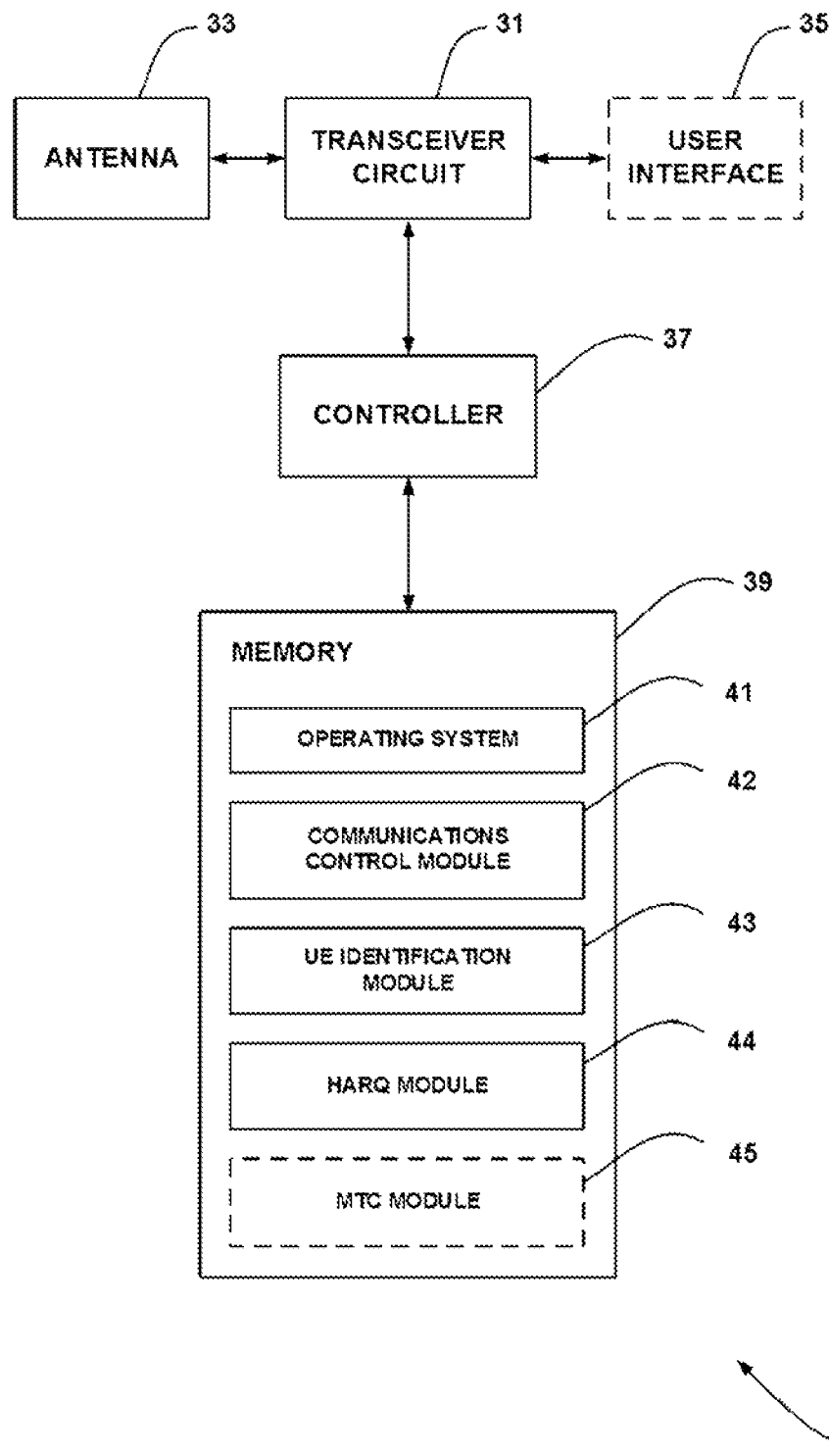
FIG. 2 is a block diagram illustrating the main components of the communication device shown in FIG. 1.

FIG. 2 is a block diagram illustrating the main components of the communication device 3 shown in FIG. 1. The communication device 3 may be an MTC device or a mobile (or 'cellular') telephone or any other type of user equipment. The communication device 3 comprises a transceiver circuit 31 which is operable to transmit signals to, and to receive signals from, the base station 5 via at least one antenna 33. Typically, the communication device 3 also includes a user interface 35 which allows a user to interact with the communication device 3. However this user interface 35 may be omitted for some MTC devices.

The operation of the transceiver circuit 31 is controlled by a controller 37 in accordance with software stored in memory 39. The software includes, among other things, an operating system 41, a communication control module 42, a UE identification module 43, a HARQ module 44, and an optional MTC module 45.

The communication control module 42 controls (uplink and downlink) communications between the communication device 3 and the base station 5 and/or other communication nodes (e.g. via the base station 5). Such communications may comprise grant-free transmissions and grant-based transmissions (and receptions), depending on the operation of the communication device 3 (and/or other factors, e.g. the data being sent).

The UE identification module 43 is responsible for identifying the communication device 3 in its communications with the base station 5 (at least within the cell of the base station 5), based on information provided (either explicitly or implicitly) by the base station 5 or by a core network node. The UE identification module 43 maintains information identifying the communication device 3, which information may be different for grant-free transmissions and grant-based transmissions.

The HARQ module 44 is responsible for generating and sending, to the serving base station 5, appropriate acknowledgements (ACK/NACK) for downlink transmissions received from the serving base station 5, and for processing acknowledgements (ACK/NACK), from the serving base station 5, for uplink transmissions by the communication device 3. The HARQ module 44 is also responsible for identifying the HARQ process to which such ACK/NACK relates.

The MTC module 45 is operable to carry out machine-type communication tasks. For example, the MTC module 45 may (e.g. periodically) receive data from a remote server (via the transceiver circuit 31) over resources allocated to the MTC device 3 by the base station 5. The MTC module 45 may also collect data for sending (e.g. periodically and/or upon detecting a trigger) to a remote server (via the transceiver circuit 31) using either grant-free transmissions or grant-based transmissions. The MTC module 45 may be configured to support coverage enhancement by controlling appropriate repetitions of uplink data and by processing (combining) repetitions of downlink data.

Base Station

Figure 3:
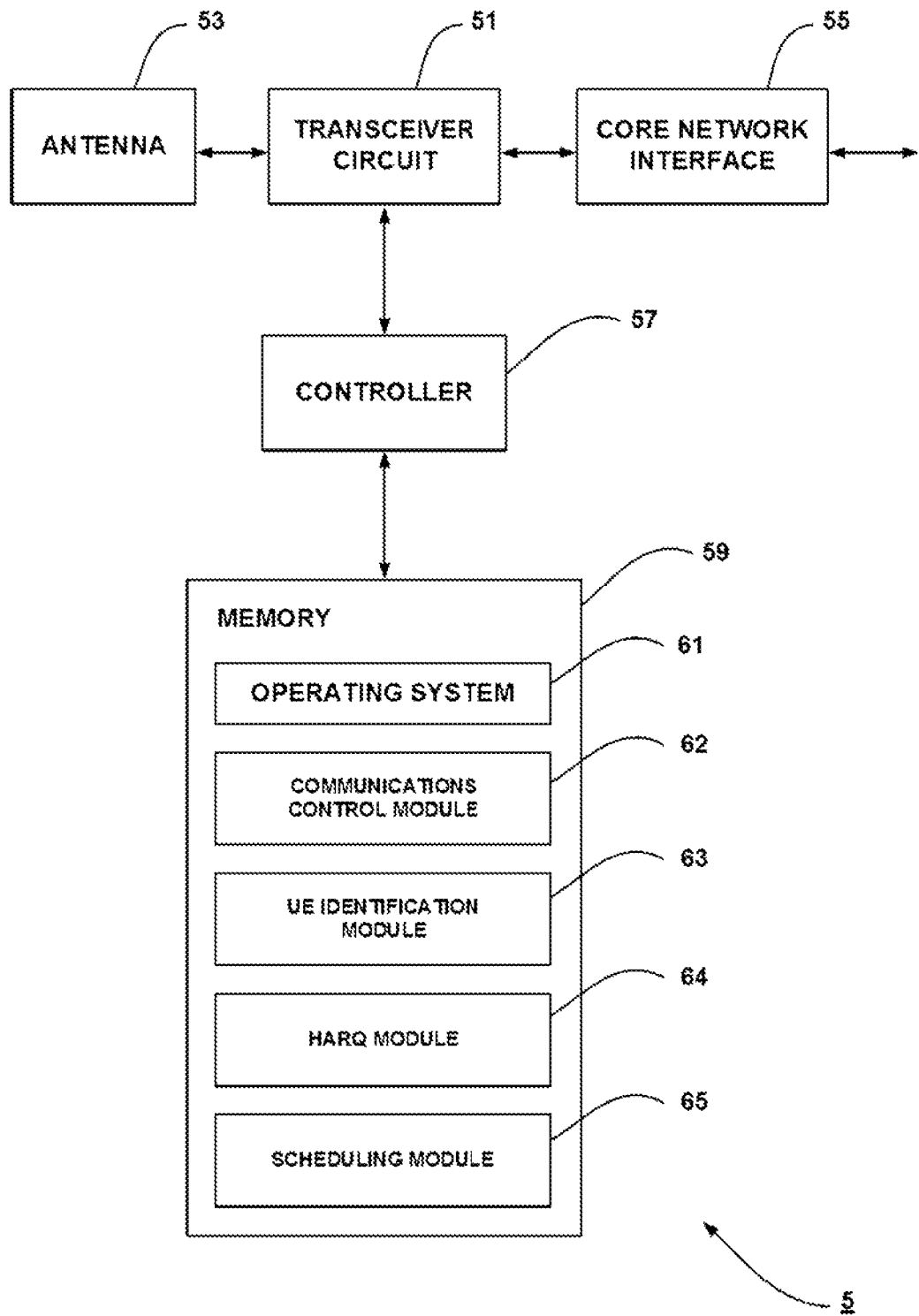
FIG. 3 is a block diagram illustrating the main components of the base station shown in FIG. 1.

FIG. 3 is a block diagram illustrating the main components of the base station 5 shown in FIG. 1. The base station 5 comprises a transceiver circuit 51 which is operable to transmit signals to, and to receive signals from, the communication devices 3 via one or more antennas 53. The base station 5 is also operable to transmit signals to and to receive signals from a core network 7 via an appropriate core network interface 55 (such as an S1/N2/N3 interface).

The operation of the transceiver circuit 51 is controlled by a controller 57 in accordance with software stored in memory 59. The software includes, among other things, an operating system 61, a communication control module 62, a UE identification module 63, a HARQ module 64, and a scheduling module 65.

The communication control module 62 controls communications with the communication devices 3 (including any MTC devices) in the base station's cell (or cells). Such communications may comprise grant-free transmissions and grant-based transmissions (and receptions).

The UE identification module 63 is responsible for identifying respective communication devices 3 communicating with the base station 5 (at least within the cell of the base station 5). Identification of a particular communication device 3 may be different for grant-free transmissions and grant-based transmissions.

The HARQ module 64 is responsible for generating and sending, to each UE, appropriate acknowledgements (ACK/NACK) for uplink transmissions received from that particular UE, and for processing acknowledgements (ACK/NACK), from communication devices 3, for downlink transmissions by the base station 5. The HARQ module 64 is also responsible for identifying the HARQ process to which such ACK/NACK relates.

The scheduling module 65 is responsible for scheduling transmissions for the communication devices 3 in the base station's cell, by generating and sending appropriately formatted control data (e.g. DCI) and/or by allocating appropriate resources for grant-free transmissions (on the uplink).

In the above description, the communication device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

Figure 4:
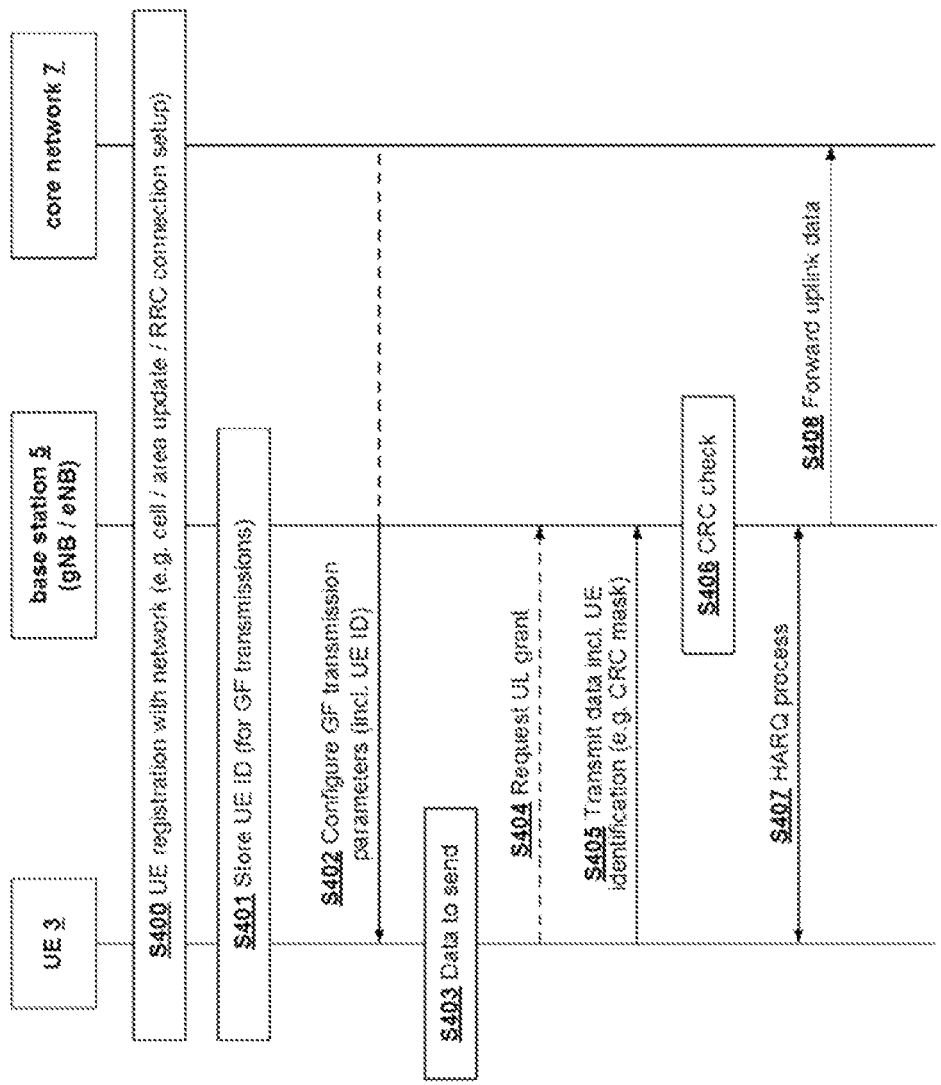
FIG. 4 illustrates an exemplary way in which grant free transmissions can be realised in the system shown in FIG. 1.

FIG. 4 illustrates an exemplary way in which grant free transmissions can be realised in the system shown in FIG. 1. In this example, uplink transmissions by the UE using grant-free resources include appropriate information identifying the sender (either explicitly or implicitly).

The base station 5 is configured to provide a number of control channels, including, for example, a physical downlink control channel (PDCCH) and a physical uplink control channel (PUCCH), and a number of data channels, including, for example, a Physical Downlink Shared Channel (PDSCH) and a Physical Uplink Shared Channel (PUSCH). The PDCCH (or an MTC specific PDCCH, 'MPDCCH') is used by the base station 5 for allocating resources to the communication devices 3 (typically by sending respective UE-specific downlink control information (DCI) to each communication device 3 that has been scheduled in the current scheduling round). The PUCCH is used by the communication devices 3 for sending UE-specific uplink control information (UCI) to the base station 5 (e.g. scheduling requests for sending uplink data, and Hybrid Automatic Repeat Request (HARQ) feedback corresponding to downlink data received using the resources allocated by a DCI). The PDSCH is the main data bearing channel which carries downlink user data, such as downlink data for a particular communication device 3 scheduled via associated DCI signalling. The PDSCH also carries system information relevant to the cell of the base station 5. The PUSCH carries uplink user data from the communication devices 3 using resources allocated by the base station 5 (based on appropriate scheduling request UCI(s) received via the PUCCH) or using time/frequency resources allocated to grant-free transmissions (when appropriate).

In the example, shown in FIG. 4, the communication device 3 initially registers with the network by performing an appropriate Radio Resource Control (RRC) connection setup with the base station 5, which may include or may be followed by a location update procedure. This is generally illustrated in step S400, which may also involve a node of the core network 7. Such location update procedure may comprise for example a procedure to update the communication device's current cell, tracking area, location area, RAN area, and/or the like. In some cases, the communication device 3 may be configured to resume an earlier RRC connection instead of setting up a new one (with or without a location update).

In this example, the communication device 3 and the base station 5 (using their associated UE identification modules 43, 63) are configured to derive an appropriate UE ID for the communication device 3. Such UE ID may be derived during the communication device's registration with the network, for example, as part of a random access procedure or an RRC procedure (in step S400). In step S401, the communication device 3 and the base station 5 store the UE ID for use in communications between the communication device 3 and the base station 5.

It will be appreciated that an appropriate Cell Radio Network Temporary Identifier (C-RNTI) may be assigned to the communication device 3. Alternatively, or additionally, the communication device 3 may be provided with a pre-configured index (from a range of indices used for GF resources shared between multiple UEs). In this case the base station 5 is configured to maintain (using its UE identification module 63) information identifying a (one-to-one) mapping between the indices of UEs multiplexed in the same resources for grant-free transmission and their actual UE IDs.

In step S402, the base station 5 configures the communication device 3 for grant-free communications by providing information/parameters for determining the appropriate time/frequency resources for transmitting uplink data without a dedicated grant (e.g. DCI). Although shown as separate steps, it will be appreciated that step S401 and/or step S402 may form part of the communication device's registration with the network (step S400).

When the communication device 3 determines that it has uplink data to send, it proceeds to preparing a set of transport blocks for transmission to the base station 5.

For sake of completeness, it is noted that a Transport Block (TB) is the basic unit exchanged between the Media Access Control (MAC) Layer and the physical layer (Layer 1 or 'L1'), for L1 processing. A Transport Block is effectively a MAC protocol data unit (PDU). A Transport Block (MAC PDU) is a bit string ordered from first to last, where the first and last bits are numbered 1 and A, respectively, and where A is the number of bits of the Transport Block. L1 adds a CRC for each Transport Block before transmission. A Transport Block Set (TBS) is defined as a set of (one or more) Transport Blocks, which are exchanged between L1 and MAC at the same time instance using the same transport channel. On a Transport Channel (between the communication device 3 and the base station 5), one Transport Block Set can be transmitted for every Transmission Time Interval (TTI).

If the communication device 3 is not configured for grant-free transmissions (or if any applicable conditions are not met), then the communication device 3 requests, in step S404, allocation (scheduling) of uplink resources before transmitting any uplink data (TB). Once the base station 5 has scheduled (via an appropriately formatted DCI and using its scheduling module 65) the communication device 3 for uplink transmission, the communication device 3 proceeds to step S405 and performs GB transmission of the uplink data using the time/frequency resources indicated by the DCI.

However, if the communication device 3 is configured for grant-free transmissions (and if the applicable conditions are met, if any), then the communication device 3 proceeds to step S405 (e.g. without performing step S404) and performs transmission of the uplink data using the time/frequency resources for GF transmissions.

Beneficially, even when using GF resources the communication device 3 is able to indicate, to the base station 5, the identity of the communication device 3. Specifically, the communication device 3 may indicate its associated UE ID by masking the cyclic redundancy check (CRC) value of the data being transmitted with the UE ID (e.g. a C-RNTI or a pre-configured index).

Therefore, the base station 5 (using its UE identification module 63) is able to identify the communication device 3 transmitting the uplink data via the GF resources based on the CRC part of the uplink data. In order to do so, the base station 5 is configured to perform, in step S406, respective CRC checks of the received data using each UE ID associated with UEs sharing the GF resources being used (for the uplink transmission in step S405), until the base station 5 finds a UE ID that passes the CRC check.

When the appropriate UE ID is found (from which the transmitting communication device 3 can be identified), the base station 5 proceeds to perform an appropriate HARQ process, in step S407, and sends an ACK to the identified communication device 3 to indicate that the data has been received successfully. However, if CRC check is not passed, a UE ID is not found yet and the base station 5 provides a NACK feedback (to all the UEs configured to share the same resources) in order to indicate the data has not been received successfully. Thus, if the GF uplink transmission has been received successfully by the base station 5, the base station 5 sends an ACK to the identified communication device 3. It will be appreciated that when the uplink data is sent using repetitions (in case of coverage enhancement being applied), the base station 5 may be configured to send an ACK as soon as it is able decode the received data (e.g. even before the UE performs all required repetitions). Alternatively, the base station 5 may send an ACK (or send a NACK if the data is not received successfully) only after the last repetition.

Beneficially, even if the CRC is not passed (and hence the transmitting UE cannot be identified based on the CRC mask), the base station 5 is able to trigger a GB re-transmission (i.e. implying a NACK), and link any subsequent re-transmission grant (DCI) to that particular communication device 3.

As generally shown in step S408, the base station 5 is also configured to forward any successfully received uplink data towards the core network 7 (using its core network interface 55).

The following is a more detailed description of some of the procedures (and some further options) performed by the controller 37 of the communication device 3 and the controller 57 of the base station 5 whilst carrying out some of the steps shown in FIG. 4 (steps S402 to S407 in particular).

As discussed above, the base station 5 can identify a UE transmitting grant-free data based on its associated UE-ID. Some of the options for explicit and implicit indication of the UE-ID are discussed below.

Explicit Identification

The UE-ID may be transmitted in a separate self-decodable channel along with the grant-free data transmission for the base station 5 to identify UE activity (i.e. which communication device 3 is transmitting uplink data over the GF resources). In order to reduce the probability of UE activity detection failure at the base station 5 and grant identification failure at UE, this channel is designed to ensure very high reliability. For increased detection performance, robust error correction codes may be used for encoding the UE-ID. Such improved detection may help to improve resource efficiency as follows:

Support soft combining of grant-free data repetitions which may lead to increased probability of successful data decoding. Hence, an ACK can be sent to the UE in order to stop any remaining repetitions and, thereby increase resource efficiency and system capacity.

Successful UE activity detection at the base station 5 may result in a faster UL grant transmission to the UE. Switching to GB transmission may beneficially reduce the probability of interference to other UEs transmitting using the grant-free transmission resources, which may also increase resource efficiency and system capacity.

It will also be appreciated that the UE ID may be transmitted in the data region of the grant-free transmission (i.e. instead of CRC masking by the UE ID). However, in this case the base station 5 need to decide the received data before it can identify the UE, and it may also result in a slight reduction in the peak data rate of grant-free transmissions (unless more resources are reserved for the grant-free transmissions to support such explicit UE identification within the data region). On the other hand, there is an improved resource utilisation due to early stop of grant-free transmissions by an ACK/grant transmission (once the UE has been identified).

Taking into account the above issues, the inventors propose to configure an appropriate one-to-one mapping between the indices of UEs multiplexed in the same resources for grant-free transmission and their actual UE-IDs. Such explicit transmission of the UE index in the data region of grant-free transmission may beneficially reduce the overhead compared to cell specific UE-ID transmission.

As described above, explicit UE identification may also be achieved by masking the CRC of the data transmitted in PUSCH with the UE ID (for example C-RNTI or a pre-configured index of the UE). This option may also be applicable to retransmissions (GF or GB). In the case of normal PUSCH transmissions, a UE-specific scrambling code may also be applied (e.g. instead of CRC masking). Scrambling needs to be removed before decoding, so if the base station 5 does not know the UE ID it may need to perform decoding multiple times which may not be practical in some systems. Therefore, it may be beneficial to mask the CRC of the data transmitted in PUSCH with the UE ID and use a special scrambling code (e.g. a pre-configured group-specific or a resource-specific scrambling code) for data in PUSCH transmission.

Linkage with GF and GB Transmissions to HARQ Processes

For a communication device 3 that supports grant-free and grant-based HARQ processes in parallel, the base station 5 may be configured to indicate whether a particular UL grant is for a HARQ process with GB (re)transmission or for a GF initial transmission. It will be appreciated that in the GB case, the base station 5 already knows which UE is going to (re)transmit the data, since the GB resources are allocated for a specific UE. However, in the GF case, the base station 5 may not have been able to identify the transmitting UE yet, since GF resources may be shared among multiple UEs (i.e. time-frequency resources and RS sequence index may be shared).

Thus, in order to differentiate between HARQ processes for GB and GF transmissions, the base station 5 may be configured to perform masking of the DCI using different identifiers (of the same UE), depending on whether the DCI applies to GB or GF. Specifically, the base station may be configured to mask the DCI for GB transmissions using the C-RNTI (for a given UE), and to mask the DCI for GF retransmission (for that UE) using a so-called 'grant-free' Radio Network Temporary Identifier (GF-RNTI). It will be appreciated that the GF-RNTI may be made specific to the frequency resources and RS sequence index that a UE has applied to transmit the initial GF data (using e.g. an appropriate formula known to both the communication device 3 and the base station 5).

The following is a brief overview of some of the exemplary formulas that may be used for calculating an appropriate UE specific GF-RNTI:

[Math. 1]

$$GF\text{-}RNTI = N_{max\_Resource\_GF}^{UL} \times RS_{index} + Resource\_GF_{index} + \text{Offset} \quad \text{Option 1:}$$

where $RS_{index}$ is the UE specific RS sequence index, $N^{UL}_{max\_Resource\_GF}$ is the maximum number of frequency-domain resources in the UL bandwidth put aside for grant-free transmissions in a cell (cell-specific) and $Resource\_GF_{index}$ is the index of the frequency-domain resource used for the recently detected UL grant-free data transmission. Offset is an additional offset value to position the GF_RNTI in to an allowable RNTI range, for example to avoid collision with the UE ID range.

[Math. 2]

$$GF\text{-}RNTI = N_{max\_RS}^{UL} \times Resource\_GF_{index} + RS_{index} + \text{Offset} \quad \text{Option 2:}$$

where $N^{UL}_{max\_RS}$ is the maximum number of RS sequences in the UL system bandwidth.

[Math. 3]

$$GF\text{-}RNTI = Resource\_GF_{index} + \text{Offset} \quad \text{Option 3:}$$

where the RS sequence index may be included in the DCI in order to link the grant to a given UE.

[Math. 4]

$$GF\text{-}RNTI = RS_{index} + \text{Offset} \quad \text{Option 4:}$$

where the $Resource\_GF_{index}$ may be included in the DCI in order to link the grant to a given UE.

[Math. 5]

$$GF\text{-}RNTI = \text{Offset} \quad \text{Option 5:}$$

where Offset=RNTI is uniquely assigned to each UE sharing the GF resources (the RNTI may be assigned via higher layers, e.g. using RRC signalling and/or the like).

It is noted that $Resource\_GF_{index}$ is the index of the frequency-domain resource used for the recently detected UL grant-free data transmission. However, since NR supports asynchronous HARQ process, it may also be necessary to address the situation wherein an UL transmission/repetition may have been lost. Therefore, the UE will attempt to decode DCI using different GF-RNTI values calculated for different values of $Resource\_GF_{index}$ corresponding to the frequency domain resource indices of all its previously transmitted repetitions. Hence, the number of DCI decoding attempts increases for options 1-3. For option 4, the GF-RNTI in the DCI is matched against the frequency domain resource indices of all the previously transmitted repetitions of the GF HARQ process.

In case of GB transmissions, each UE follows the scheduling command from the base station 5 where the associated HARQ process number is always included in the DCI format. However, in the case of GF transmissions, a UE will typically start its grant-free transmissions autonomously, thus, a mechanism to determine the HARQ process number is necessary in order to align the HARQ process number between the UE 3 and the base station 5. One way to determine the HARQ process number for GF transmissions is to pre-allocate specific HARQ processes for GF transmissions via RRC configuration (i.e. similarly to semi-persistent scheduling (SPS) in LTE). For example two HARQ processes with numbers 0, 1 may be pre-allocated for GF transmissions, and the numbers can be derived from even or odd indices of the slots or pre-configured resources within a given radio frame. It is also noted that this only derives the numbering of the HARQ processes for UL GF transmissions, but, an adaptive asynchronous HARQ mode may still be utilised where the base station 5 can schedule retransmissions anywhere in the UL system bandwidth (i.e. not necessarily following the pre-configured UL resources for GF transmissions) as well as different slots in time.

Beneficially, The HARQ processes for GB and GF transmissions can be identified based on the different RNTIs used for masking the DCIs (for GB and GF). A dedicated GF-RNTI may be used for UL grant-free retransmissions. The GF-RNTI may be derived from the frequency-domain resources and RS sequence index being used.

For any of options 1 to 5 above, the GF-RNTI for a given communication device 3 may be calculated using one of the following options:

1) Both the base station 5 and the communication device 3 calculate the GF-RNTI using a specific formula. In this case the base station 5 is configured to signal all the necessary parameters to the communication device 3.

2) The base station 5 calculates the GF-RNTI using an appropriate formula (e.g. using UE specific parameters) and signals the GF-RNTI explicitly to the communication device 3 to which it is applicable. In this case the communication device 3 does not need to know the formula (and/or parameters) being used for the calculation of the GF-RNTI.

It will be appreciated that if resources are not shared by multiple UEs, the above GF-RNTI will be unique to a particular UE, i.e. the UE that has transmitted on that specific frequency resource and RS sequence index. In this case therefore the base station 5 can identify the UE based on the GF-RNTI and it can send an ACK or UL grant for retransmission to that UE (depending on whether the data is successfully decoded or not) without additional processing.

In order to allow freeing up a HARQ process for further GF transmissions (e.g. by other UEs) after an initial GF transmission and successful UE identification using that HARQ process, the base station 5 may be configured to assign a new HARQ process (for GB transmission) via the DCI for retransmission. However, preferably, the old HARQ process should also be identified in the DCI so that the relationship between the new and old HARQ processes is known to both the base station 5 and the UE 3. For example, the DCI format may be adapted to include an identifier of both HARQ processes e.g. by reusing some of the fields for this purpose while keeping DCI size same for GB and GF transmissions. Alternatively, e.g. if the GF HARQ process number is not included in the DCI, the GF HARQ process number may be included in the calculation of the GF-RNTI. For example, the GF HARQ process number may be included as an additive factor in the aforementioned options 1-5 as follows:

[Math. 6]

$$GF\text{-}RNTI = N_{max\_Resource\_GF}^{UL} \times RS_{index} + Resource\_G\text{-}F_{index} + HARQ_{index} + \text{Offset} \quad \text{Option 1:}$$

$$GF\text{-}RNTI = N_{max\_RS}^{UL} \times Resource\_GF_{index} + RS_{index} + HARQ_{index} + \text{Offset} \quad \text{Option 2:}$$

$$GF\text{-}RNTI = Resource\_GF_{index} + HARQ_{index} + \text{Offset} \quad \text{Option 3:}$$

$$GF\text{-}RNTI = RS_{index} + HARQ_{index} + \text{Offset} \quad \text{Option 4:}$$

$$GF\text{-}RNTI = HARQ_{index} + \text{Offset} \quad \text{Option 5:}$$

Figure 5:
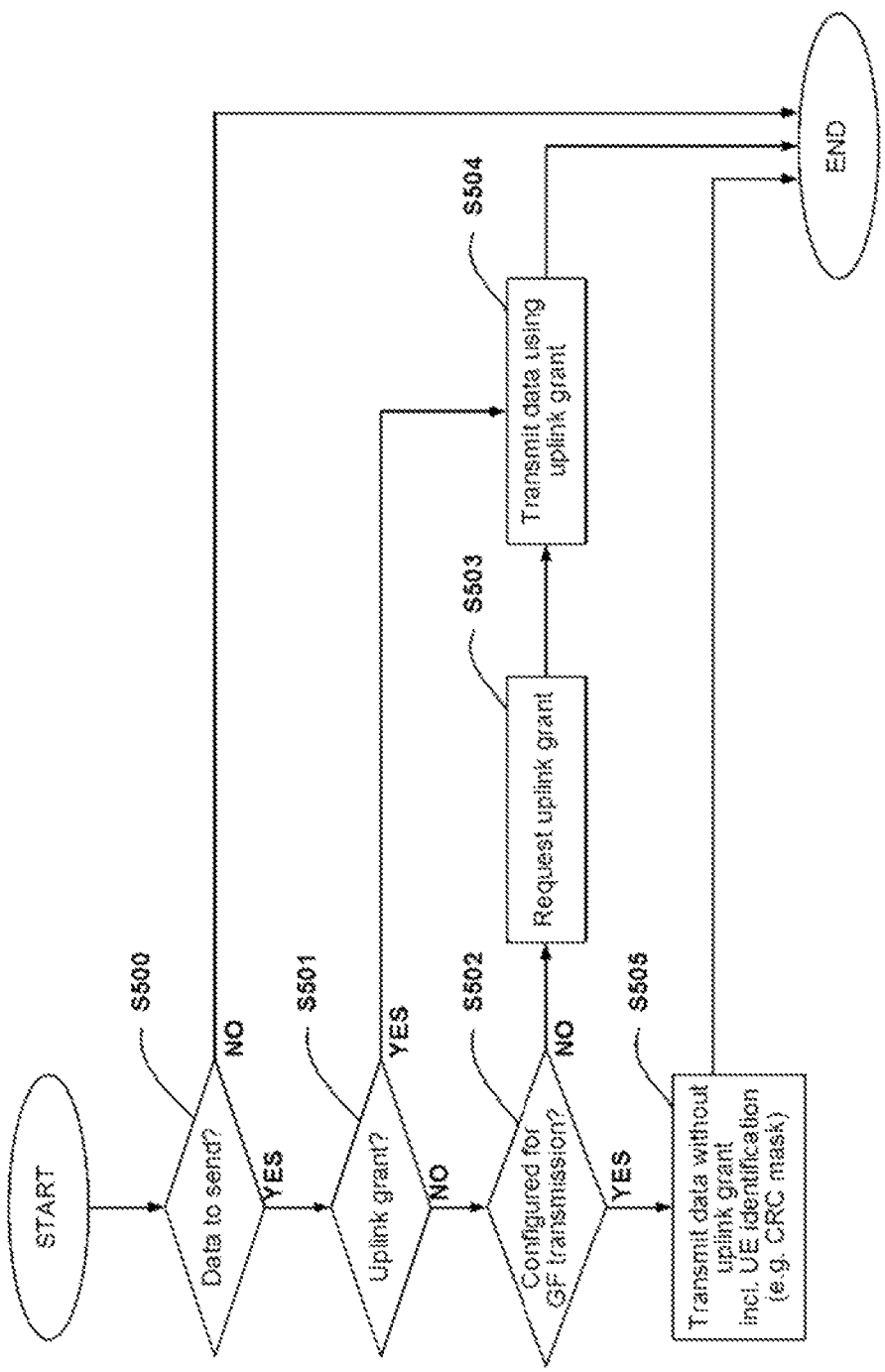
FIG. 5 illustrates an exemplary procedure performed at the communication device (UE) and the base station of FIG. 1 for uplink transmissions/reception in accordance with an example embodiment of the present invention.
Figure 6:
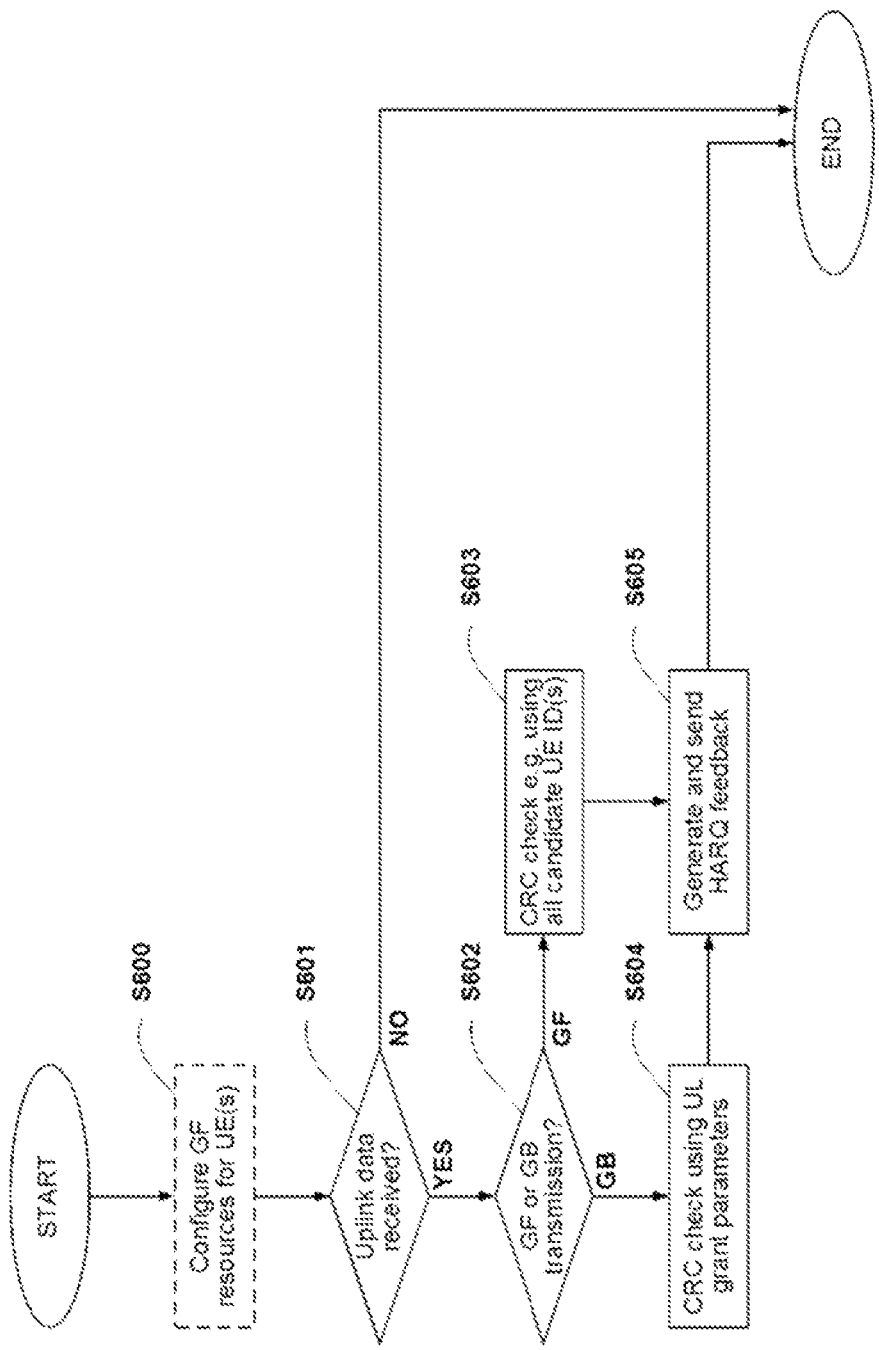
FIG. 6 illustrates an exemplary procedure performed at the communication device (UE) and the base station of FIG. 1 for uplink transmissions/reception in accordance with an example embodiment of the present invention.

FIG. 5 illustrates an exemplary procedure performed at the communication device 3 for performing uplink transmissions (using grant-free/grant-based) resources (in a given TTI), and FIG. 6 illustrates a corresponding procedure performed at the base station 5 for processing the received uplink data (e.g. in order to determine the identity of the sender).

At the beginning of the current TTI, the communication device 3 checks, in step S500, whether it has any uplink data to send to the base station 5. If the communication device 3 does not have any uplink data the procedure ends.

If the communication device 3 has uplink data to send (step S500: 'YES'), then it checks whether or not any grant-based resources have been allocated (e.g. via an appropriately formatted DCI) for transmitting that data. If grant-based resources have been allocated (step S501: 'YES'), then the communication device 3 proceeds to step S504 and transmits the uplink data using the allocated GB time/frequency resources (as indicated by the associated DCI).

However, if grant-based resources have not been allocated (step S501: 'NO') with respect to the uplink data to be sent, then the communication device 3 proceeds to step S502 and checks whether any grant-free communication resources have been configured for this communication device 3 that may be used for sending the uplink data. If no grant-free communication resources have been configured for this communication device 3 (step S502: 'NO'), then the communication device 3 requests an uplink grant (in step S503) before it can transmit (in step S504) the uplink data using the time/frequency resources allocated by the grant (in the same or in a subsequent TTI).

If grant-free communication resources have been configured for this communication device 3 (step S502: 'YES'), then the communication device 3 transmits (in step S505) the uplink data using the GF time/frequency resources.

It will be appreciated that the communication device 3 may be configured to use a different UE ID depending on whether the uplink data is transmitted via the GF or GB resources. Specifically, if the communication device 3 uses GF resources, it may performs a masking of the CRC value using its associated UE ID for grant-free transmissions (e.g. C-RNTI or a suitable index value).

Although not shown in FIG. 5, it will be appreciated that following uplink transmission (step S504/S505) the communication device 3 and the base station 5 may also proceed to perform an appropriate HARQ process, as described with reference to step S407 above. The HARQ process may use a different HARQ process identifier depending on the type of transmission (GB or GF) and the associated DCI may include information identifying a link between the GF and GB HARQ processes for the given communication device 3.

Turning now to FIG. 6, the procedure at the base station 5 begins by checking, in step S601, whether the base station 5 is receiving any uplink data in the current scheduling round (TTI). It will be appreciated that this step may be preceded by an appropriate configuration of (at least some) UEs within the base station's cell for using GF resources (step S600), although such configuration is not necessarily performed in each scheduling round. In some cases, such configuration step may be omitted completely or it may be performed by a different base station (e.g. a previous serving base station) or it may be performed by the communication device 3 on its own, without involving the current base station 5.

If the base station 5 has not received any uplink data (or it does not have more data to process), then the procedure ends for the remainder of the current scheduling round. If the base station 5 received uplink data (which has not been processed yet), then the base station 5 proceeds to step S602.

In step S602, the base station 5 is configured to determine whether the received data was transmitted using grant-free (label 'GF' in FIG. 6) or grant-based communication resources (label 'GB' in FIG. 6). Depending on the result of this determination, the base station 5 proceeds to step S603 (when it is determined that the received data was transmitted using grant-free resources) or it proceeds to step S604 (when it is determined that the received data was transmitted using grant-based resources).

In step S603, the base station 5 performs an iterative CRC check procedure using (one by one) the UE IDs of all such UEs that are configured to share the GF resources being used, until the base station 5 finds a UE ID value that passes CRC check for the received data. When the correct UE ID is found (from which the transmitting communication device 3 can be identified) the base station 5 proceeds to step S605 in which it generates and sends an appropriate HARQ feedback (ACK) to the identified communication device 3. Although not shown in FIG. 6, it will be appreciated that the base station 5 may also request (e.g. by sending an appropriately formatted DCI) the communication device 3 to use GB resources for retransmitting the received data (e.g. in case of a reception failure).

In step S604 (i.e. when the received data was transmitted using GB resources), the base station 5 performs a regular CRC check using the parameters associated with the communication device 3 to which the GB resources have been allocated. The base station 5 then proceeds to step S605 in order to generate and send an appropriate HARQ feedback (ACK/NACK) to the scheduled communication device 3.

Modifications and Alternatives

Detailed example embodiments have been described above. As those skilled in the art will appreciate, a number of modifications and alternatives can be made to the above example embodiments whilst still benefiting from the inventions embodied therein.

In the above description the UE is configured to provide an explicit identification (UE ID) when transmitting uplink data via GF resources. However, it will also be appreciated that an implicit identification may be used instead.

Specifically, an implicit identification may be used to help the base station detect UE activity, without adversely affecting peak data rate of grant-free transmissions. Such implicit identification may be possible for example based on a predefined mapping rule between UE-IDs and e.g. time-frequency resources and/or RS sequence used for grant-free data transmission.

For example, a particular UE may be identified from the time-frequency resources used for its grant-free transmission. However, a one-to-one mapping between the actual UE-ID and time-frequency resources used for transmission is only possible if the network has configured UE-dedicated time-frequency resources for grant-free data transmission. While this can avoid collision between UEs transmitting grant-free data in the UL, reserving UE dedicated resources may result in underutilisation of system resources particularly for sporadic type of traffic. However, if multiple UEs are configured to share the same resources, the base station cannot map the resource index to any particular UE ID. Instead, it will be appreciated that the base station may indicate an appropriate index in the UL grant to a specific UE in order to link the grant with the UL grant-free data transmission.

Another possible implicit identification approach is to configure the UE with a dedicated RS sequence index on a shared time-frequency resource to enable both UE detection as well as data demodulation. However, in this case, the complexity of RS sequence detection will increase with an increase in number of sequences. Moreover, UE detection performance using RS will vary depending on the traffic arrival rate, accuracy of power control of UEs and number of users configured to share same resources for grant-free transmission. Therefore, in order to enhance the performance of resource sharing among multiple UEs based on RS sequence, the base station may be configured to dynamically configure the maximum number of UEs sharing the same resources. In this case, for example, the number of users multiplexed in the same resource may be reduced if the base station detects that detection and/or decoding failure is above a certain pre-configured threshold.

It will be appreciated that although the communication system is described in terms of the base station operating as a regular (macro) base station, the same principles may be applied to base stations operating as macro or pico base stations, femto base stations, relay nodes providing elements of base station functionality, home base stations (HeNB), or other such communication nodes.

In the above example embodiments, a 5G telecommunications system and a 5G base station (gNB) was described. As those skilled in the art will appreciate, the techniques described in the present application can be employed in other communications systems, including earlier 3GPP systems (e.g. LTE/LTE-A).

Whilst the base station has been described in terms of a stand-alone gNB it may be any suitable base station including a base station in which the functionality of a gNB may be split between one or more distributed units (DUs) and a central unit (CU) with a CU typically performing higher level functions and communication with the next generation core and with the DU performing lower level functions and communication over an air interface with user equipment (UE) in the vicinity (i.e. in a cell operated by the gNB).

In the example embodiments described above, the base station and the communication device (UE) each include transceiver circuitry. Typically, this circuitry will be formed by dedicated hardware circuits. However, in some example embodiments, part of the transceiver circuitry may be implemented as software run by the corresponding controller.

In the above example embodiments, a number of software modules were described. As those skilled in the art will appreciate, the software modules may be provided in compiled or un-compiled form and may be supplied to the base station or the communication device as a signal over a computer network, or on a recording medium. Further, the functionality performed by part or all of this software may be performed using one or more dedicated hardware circuits.

For example, functionality and/or modules described herein may be implemented using one or computer processing apparatus having one or more hardware computer processors programmed using appropriate software instructions to provide the required functionality (e.g. one or more computer processors forming part of the controllers described with reference to the FIG. 2 or 3). It will be further appreciated that all or part of these functions may be implemented in hardware as dedicated circuitry for example using one or more dedicated integrated circuits such as an application specific integrated circuit (ASIC) or the like.

It will be appreciated that the controllers referred to in the description of the communication device and base station (i.e. with reference to FIGS. 2 and 3) may comprise any suitable controller such as, for example an analogue or digital controller. Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, machine-type communication devices and mobile telephones (mobile devices) are described. Such mobile devices might comprise, for example, mobile telephones, smartphones, user equipment, personal digital assistants, laptop/tablet computers, web browsers, e-book readers and/or the like. Such mobile (or even generally stationary) devices are typically operated by a user. However, it will be appreciated that mobile telephones (and similar user equipment) may also be configured to operate as machine-type communication devices. For example, the mobile telephone 3-1 may include (and/or provide the functionality of) the MTC module 45.

Although the communication device 3 was described above to perform repetitions of its uplink transmissions, it will be appreciated that the communication device 3 may be operating without any or with only a minor coverage enhancement (referred to as 'CE mode A' operation). In this case the communication device 3 may be configured not to perform any repetitions or it may be configured to perform a single or a relatively low number of repetitions (e.g. a maximum of four transmissions per transport block).

Examples of MTC Applications

It will be appreciated that each communication device may support one or more MTC applications. Some examples of MTC applications are listed in the following table (source: 3GPP TS 22.368 V14.0.0, Annex B). This list is not exhaustive and is intended to be indicative of the scope of machine-type communication applications.

TABLE 1

| Service Area | MTC applications |
| --- | --- |
| Security | Surveillance systems |
| | Backup for landline |
| | Control of physical access (e.g. to buildings) |
| | Car/driver security |

TABLE 1-continued

| Service Area | MTC applications |
| --- | --- |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

The identity information for identifying the communication device may comprise a temporary network identifier (e.g. a Cell Radio Network Temporary Identifier (C-RNTI)).

The identity information for identifying the communication device may comprise a pre-configured index associated with the communication device.

The method may further comprise the base station providing feedback (e.g. ACK/NACK) for the received uplink data, to a candidate communication device identified as the communication device from which the uplink data has been received.

The method may further comprise the base station allocating dedicated communication resources for subsequent uplink transmissions by a candidate communication device identified as the communication device from which the uplink data has been received. For example, the base station may allocate dedicated communication resources, for a candidate communication device identified as the communication device from which the uplink data has been received, using a Downlink Control Information (DCI) wherein the DCI is encoded i) using a temporary network identifier of a first type (e.g. a Cell Radio Network Temporary Identifier (C-RNTI)) for that communication device when said allocation is for transmitting further uplink data or ii) using a temporary network identifier of second type (different to the first type) when said allocation is for retransmitting the received uplink data.

The temporary network identifier of the second type may be determined based on a predetermined formula, using information specific to the transmission of uplink data received from the communication device. For example, the temporary network identifier of the second type may be determined based on at least one of:

[Math. 7]

the formula:

$$GF\text{-}RNTI = N_{max\_Resource\_GF}^{UL} \times RS_{index} + Resource\_GF_{index} + \text{Offset}$$

the formula:

$$GF\text{-}RNTI = N_{max\_RS}^{UL} \times Resource\_GF_{index} + RS_{index} + \text{Offset}$$

the formula:

$$GF\text{-}RNTI = Resource\_GF_{index} + \text{Offset}$$

the formula:

$$GF\text{-}RNTI = RS_{index} + \text{Offset; and}$$

the formula:

$$GF\text{-}RNTI = \text{Offset;}$$

where GF-RNTI is the temporary network identifier of the second type; $N^{UL}_{max\_Resource\_GF}$ is the maximum number of frequency-domain resources put aside for grant-free uplink transmissions in a cell of the base station; $RS_{index}$ is an index of a bandwidth parameter specific to the communication device; $Resource\_GF_{index}$ is an index of the frequency-domain resource used for a previous grant-free data transmission to be retransmitted; Offset is an optional offset value to position the temporary network identifier of the second type into a predetermined range; and $N^{UL}_{max\_RS}$ is the maximum number of RS sequences in an uplink system bandwidth of the base station.

The predetermined formula may further comprise the addition of an index of a Hybrid Automatic Repeat Request (HARQ) process to which the control information relates. The control information may comprise Downlink Control Information (DCI).

The received transmission of uplink data from the communication device may comprise information from which the communication device can be identified; and wherein the information from which the communication device can be identified comprises a Cyclic Redundancy Check (CRC) value that is encoded with identity information identifying the communication device.

Various other modifications will be apparent to those skilled in the art and will not be described in further detail here.

Some of or all the above-described example embodiments can be described as in the following Supplementary Notes, but are not limited to the following.

Supplementary Note 1

A method performed by a communication device of a communication system, the method comprising:
    transmitting, to a base station and using grant-free communication resources, uplink data and information from which the communication device can be identified;
    wherein the information from which the communication device can be identified comprises a Cyclic Redundancy Check (CRC) value that is encoded with identity information identifying the communication device.

(Supplementary Note 2)

The method according to Supplementary Note 1, wherein said identity information for identifying the communication device comprises at least one of a temporary network identifier (e.g. a Cell Radio Network Temporary Identifier (C-RNTI) and a pre-configured index associated with the communication device.

(Supplementary Note 3)

A method performed by a base station of a communication system, the method comprising:
    receiving, from a communication device and using grant-free communication resources, uplink data and information from which the communication device can be identified, wherein the information from which the communication device can be identified comprises a Cyclic Redundancy Check (CRC) value that is encoded with identity information identifying the communication device;
    attempting to decode the CRC value using identity information identifying a candidate communication device;
    when said attempt is successful, identifying the candidate communication device as the communication device from which the uplink data has been received; and
    when said attempt is not successful, not identifying the candidate communication device as the communication device from which the uplink data has been received.

(Supplementary Note 4)

The method according to Supplementary Note 3, wherein said identity information identifying the communication device comprises a temporary network identifier (e.g. a Cell Radio Network Temporary Identifier (C-RNTI)).

(Supplementary Note 5)

The method according to Supplementary Note 3, wherein said identity information identifying the communication device comprises a pre-configured index associated with the communication device.

(Supplementary Note 6)

The method according to any one of Supplementary Notes 3 to 5, further comprising providing feedback (e.g. ACK/NACK) for the received uplink data, to a candidate communication device identified as the communication device from which the uplink data has been received.

(Supplementary Note 7)

The method according to any one of Supplementary Notes 3 to 6, further comprising allocating dedicated communication resources for subsequent uplink transmissions by a candidate communication device identified as the communication device from which the uplink data has been received.

(Supplementary Note 8)

The method according to any one of Supplementary Notes 3 to 7, comprising allocating dedicated communication resources, for a candidate communication device identified as the communication device from which the uplink data has been received, using a Downlink Control Information (DCI) wherein the DCI is encoded i) using a temporary network identifier of a first type (e.g. a Cell Radio Network Temporary Identifier (C-RNTI)) for that communication device when said allocation is for transmitting further uplink data or ii) using a temporary network identifier of second type (different to the first type) when said allocation is for retransmitting the received uplink data.

(Supplementary Note 9)

A method performed by a base station of a communication system, the method comprising:
    receiving, from a communication device and using grant-free communication resources, a transmission of uplink data;
    generating control information for allocating communication resources to the communication device, for at least one of transmitting further uplink data and for retransmitting the received uplink data;

wherein the control information is encoded: i) using a temporary network identifier of a first type (e.g. a Cell Radio Network Temporary Identifier (C-RNTI)) for the communication device when the allocation is for transmitting further uplink data or ii) using a temporary network identifier of second type (different to the first type) when the allocation is for retransmitting the received uplink data; and transmitting the encoded control information to said communication device.

(Supplementary Note 10)

The method according to Supplementary Note 9, wherein said temporary network identifier of the second type is determined based on a predetermined formula, using information specific to the transmission of uplink data received from the communication device.

(Supplementary Note 11)

The method according to Supplementary Note 9, wherein said temporary network identifier of the second type is determined based on at least one of:

[Math. 8]

the formula:

$$GF\text{-}RNTI = N_{max\_Resource\_GF}^{UL} \times RS_{index} + Resource\_GF_{index} + Offset;$$

the formula:

$$GF\text{-}RNTI = N_{max\_RS}^{UL} \times Resource\_GF_{index} + RS_{index} + Offset;$$

the formula:

$$GF\text{-}RNTI = Resource\_GF_{index} + Offset;$$

the formula:

$$GF\text{-}RNTI = RS_{index} + Offset;\text{ and}$$

the formula:

$$GF\text{-}RNTI = Offset;$$

where GF-RNTI is the temporary network identifier of the second type; $N^{UL}_{max\_Resource\_GF}$ is the maximum number of frequency-domain resources put aside for grant-free uplink transmissions in a cell of the base station; $RS_{index}$ is an index of a bandwidth parameter specific to the communication device; $Resource\_GF_{index}$ is an index of the frequency-domain resource used for a previous grant-free data transmission to be retransmitted; Offset is an optional offset value to position the temporary network identifier of the second type into a predetermined range; and $N^{UL}_{max\_RS}$ is the maximum number of RS sequences in an uplink system bandwidth of the base station.

(Supplementary Note 12)

The method according to Supplementary Note 11, wherein the predetermined formula further comprises the addition of an index of a Hybrid Automatic Repeat Request (HARQ) process to which the control information relates.

(Supplementary Note 13)

The method according to any one of Supplementary Notes 9 to 12, wherein said control information comprises Downlink Control Information (DCI).

(Supplementary Note 14)

The method according to any one of Supplementary Notes 9 to 13, wherein the received transmission of uplink data from the communication device comprises information from which the communication device can be identified; and wherein the information from which the communication device can be identified comprises a Cyclic Redundancy Check (CRC) value that is encoded with identity information identifying the communication device.

(Supplementary Note 15)

A method performed by a communication device of a communication system, the method comprising:

transmitting, to a base station of the communication system and using grant-free communication resources, a transmission of uplink data;

receiving, from the base station, control information for allocating communication resources to the communication device, for at least one of transmitting further uplink data and for retransmitting the transmitted uplink data;

wherein the control information is encoded: i) using a temporary network identifier of a first type (e.g. a Cell Radio Network Temporary Identifier (C-RNTI)) for the communication device when the allocation is for transmitting further uplink data or ii) using a temporary network identifier of second type (different to the first type) when the allocation is for retransmitting the transmitted uplink data; and transmitting further uplink data or retransmitting the transmitted uplink data to the base station, using said allocated communication resources, based on said control information.

(Supplementary Note 16)

The method according to Supplementary Note 15, wherein said temporary network identifier of second type is determined based on a predetermined formula, using information specific to the transmission of uplink data.

(Supplementary Note 17)

A communication device for a communication system, wherein the communication device comprises:

a controller and a transceiver, wherein the controller is operable to control the transceiver to transmit, to a base station and using grant-free communication resources, uplink data and information from which the communication device can be identified; wherein the information from which the communication device can be identified comprises a Cyclic Redundancy Check (CRC) value that is encoded with identity information identifying the communication device.

(Supplementary Note 18)

A base station for a communication system, wherein the base station comprises:

a controller and a transceiver, wherein the controller is operable to: control the transceiver to receive, from a communication device and using grant-free communication resources, uplink data and information from which the communication device can be identified, wherein the information from which the communication device can be identified comprises a Cyclic Redundancy Check (CRC) value that is encoded with identity information identifying the communication device;

attempt to decode the CRC value using identity information identifying a candidate communication device;

when said attempt is successful, identify the candidate communication device as the communication device from which the uplink data has been received; and when said attempt is not successful, not identify the candidate communication device as the communication device from which the uplink data has been received.

(Supplementary Note 19)
A communication device for a communication system, wherein the machine type communication device comprises:
a controller and a transceiver; wherein the controller is operable to control the transceiver to:
transmit, to a base station of the communication system and using grant-free communication resources, a transmission of uplink data; and
receive, from the base station, control information for allocating communication resources to the communication device, for at least one of transmitting further uplink data and for retransmitting the transmitted uplink data;
wherein the control information is encoded: i) using a temporary network identifier of a first type (e.g. a Cell Radio Network Temporary Identifier (C-RNTI)) for the communication device when the allocation is for transmitting further uplink data or ii) using a temporary network identifier of second type (different to the first type) when the allocation is for retransmitting the transmitted uplink data; and
transmit further uplink data or retransmitting the transmitted uplink data to the base station, using said allocated communication resources, based on said control information.

(Supplementary Note 20)
A base station for a communication system, wherein the base station comprises:
a controller and a transceiver, wherein the controller is operable to:
control the transceiver to receive, from a communication device and using grant-free communication resources, a transmission of uplink data;
generate control information for allocating communication resources to the communication device, for at least one of transmitting further uplink data and for retransmitting the received uplink data;
wherein the control information is encoded: i) using a temporary network identifier of a first type (e.g. a Cell Radio Network Temporary Identifier (C-RNTI)) for the communication device when the allocation is for transmitting further uplink data or ii) using a temporary network identifier of second type (different to the first type) when the allocation is for retransmitting the received uplink data; and
control the transceiver to transmit the encoded control information to said communication device.

(Supplementary Note 21)
A system comprising: the communication device according to Supplementary Note 17 or 19; and the base station according to Supplementary Note 18 or 20.

(Supplementary Note 22)
A computer implementable instructions product comprising computer implementable instructions for causing a programmable communications device to perform the method according to any one of Supplementary Notes 1 to 16.

The invention claimed is:

1. A method for a user equipment (UE), the method comprising:
scrambling data including a Physical Uplink Shared Channel (PUSCH) and a Cyclic Redundancy Check (CRC) for the PUSCH, using a parameter specific for transmission without a dynamic grant;
determining a Hybrid Automatic Repeat Request (HARQ) process number corresponding to transmission without a dynamic grant based on a resource in a predetermined radio frame and a parameter included in a Radio Resource Control (RRC) message, in a case where the transmission without a dynamic grant is available based on a timing of the transmission without a dynamic grant and a timing of a transmission with a dynamic grant;
transmitting the data to a base station, via the transmission without a dynamic grant; and
retransmitting the data to the base station, via the transmission with a dynamic grant, using the parameter specific for the transmission without a dynamic grant.

2. The method according to claim 1, further comprising:
configuring a HARQ process corresponding to the HARQ process number specific for the transmission without a dynamic grant.

3. The method according to claim 1, wherein the parameter specific for the transmission without a dynamic grant is derived based on the RRC message.

4. The method according to claim 1, wherein the parameter comprises at least one of:
a parameter for indicating a periodicity for the transmission without a dynamic grant;
a parameter for indicating at least one HARQ process for the transmission without a dynamic grant; or
a parameter for indicating a resource for the transmission without a dynamic grant.

5. A user equipment (UE) comprising:
a memory storing instructions; and
at least one processor configured to process the instructions to:
scramble data including a Physical Uplink Shared Channel (PUSCH) and a Cyclic Redundancy Check (CRC) for the PUSCH, using a parameter specific for a transmission without a dynamic grant;
determine a Hybrid Automatic Repeat Request (HARQ) process number corresponding to a transmission without a dynamic grant based on a resource in a predetermined radio frame and a parameter included in a Radio Resource Control (RRC) message, in a case where the transmission without a dynamic grant is available based on a timing of the transmission without a dynamic grant and a timing of a transmission with a dynamic grant;
transmit the data to a base station, via the transmission without a dynamic grant; and
retransmit the data to the base station, via the transmission with a dynamic grant, using the parameter specific for the transmission without a dynamic grant.

6. A method performed by a base station, the method comprising:
transmitting, to a user equipment (UE), a Radio Resource Control (RRC) message including a parameter for a transmission without a dynamic grant;
configuring a parameter specific for a transmission without a dynamic grant used by the UE in scrambling data including a Physical Uplink Shared Channel (PUSCH) and a Cyclic Redundancy Check (CRC) for the PUSCH;
receiving the data from the UE, via the transmission without a dynamic grant; and
receiving the data from the UE, via a transmission with a dynamic grant, using the parameter specific for the transmission without a dynamic grant,
wherein a Hybrid Automatic Repeat Request (HARQ) process number corresponding to the transmission without a dynamic grant is determined based on a resource in a predetermined radio frame and the parameter included in the RRC message, in a case where the transmission without a dynamic grant is available based on a timing of the transmission without a dynamic grant and a timing of the transmission with a dynamic grant.

7. A base station comprising:
a memory storing instructions; and
at least one processor configured to process the instructions to:
- transmit, to a user equipment (UE), a Radio Resource Control (RRC) message including a parameter for a transmission without a dynamic grant;
- configure a parameter specific for the transmission without a dynamic grant used by the UE in scrambling data including a Physical Uplink Shared Channel (PUSCH) and a Cyclic Redundancy Check (CRC) for the PUSCH;
- receive the data from the UE, via the transmission without a dynamic grant; and
- receive the data from the UE, via a transmission with a dynamic grant, using the parameter specific for the transmission without a dynamic grant, wherein a Hybrid Automatic Repeat Request (HARQ) process number corresponding to the transmission without a dynamic grant is determined based on a resource in a predetermined radio frame and the parameter included in the RRC message, in a case where the transmission without a dynamic grant is available based on a timing of the transmission without a dynamic grant and a timing of the transmission with a dynamic grant.

* * * * *